Dec. 16, 1958   F. W. DOERING ET AL   2,864,159
METHOD OF MAKING SPLICING SLEEVE ASSEMBLIES
Filed Sept. 29, 1954

INVENTORS
F. W. DOERING
J. C. MORISON
BY C. B. Hamilton
ATTORNEY

# United States Patent Office 2,864,159
Patented Dec. 16, 1958

2,864,159

METHOD OF MAKING SPLICING SLEEVE ASSEMBLIES

Fred W. Doering, Cicero, and James C. Morison, La Grange, Ill., assignors to Western Electric Company, Incorporated, New York, N. Y., a corporation of New York Application September 29, 1954, Serial No. 459,029

2 Claims. (Cl. 29—422)

This invention relates to a method of making sleeve assemblies for splicing electrical conductors and more particularly to a method of flaring one end of a metal sleeve telescoped within a plastic sleeve and for sealing one of the projecting ends of the plastic sleeve.

An object of the invention is to provide an improved method of making sleeve assemblies for splicing electrical conductors.

Another object of the invention is to provide an improved method of assembling a metal sleeve within a thermoplastic sleeve to form a splicing sleeve assembly and for flaring the end of the metal sleeve to interconnect the sleeves and to guide members thereinto.

A further object of the invention is to provide an improved method of assembling a thermoplastic sleeve over a metal sleeve and to seal one end of the thermoplastic sleeve to form a splicing sleeve assembly.

A method illustrating certain features of the invention may include a pair of cooperating flaring tools on the shank of one of which is mounted a thermoplastic sleeve and on the shank of the other of which is mounted a metal sleeve. The sleeves and tools are aligned with each other and the tools are moved toward each other to slide the metal sleeve within the thermoplastic sleeve and to position the ends of the inner metal sleeve in a predetermined spaced relation to the ends of the thermoplastic sleeve, after which the tools with the telescoped sleeves thereon are placed between a pair of relatively movable pressure applying jaws which are actuated to move the tools together to flare one end of the inner metal tube into interlocking engagement with the other tube. One of the tools with the interlocked sleeves thereon is positioned in alignment with a sealing device and moved to telescope one end of the plastic tube over a retractible heating element of the sealing device to be internally heated thereby and a plurality of radially movable heated forming jaws are actuated in timed relation to the retraction of the heating element to press the walls of the end portion of the tube laterally against each other to seal said end of the tube.

Other objects and advantages of the invention will become apparent by reference to the following detailed description and the accompanying drawings illustrating a preferred embodiment thereof, in which Fig. 1 is an elevational sectional view of the metal and thermoplastic sleeves to be assembled mounted on a pair of cooperative flaring tools in spaced relation to each other;

Figure 5:
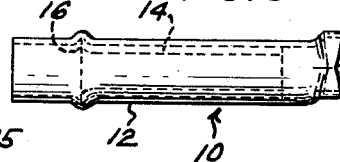
Figs. 5 and 6 are side and end views, respectively, of the sleeve assemblies.
Figure 6:
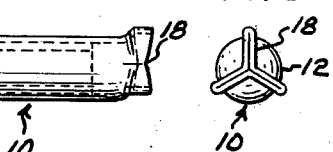

Referring to the drawings, Figs. 5 and 6 show a splicing sleeve assembly 10 for splicing the ends of electrical conductors. The sleeve assembly 10 comprises an outer sleeve 12 of thermoplastic material and an inner sleeve 14 of metal such as aluminum or brass which is slidable within the outer sleeve and positioned therein with the ends in spaced relation to the ends of the outer sleeve, and one end of the inner sleeve 14 is flared as at 16 to deform the outer sleeve 12 and interconnect the two sleeves against relative displacement and to guide into the metal sleeve the conductors which are to be spliced. The end portion 18 of the outer thermoplastic sleeve 12 is collapsed and the wall portions thereof are pressed into engagement with each other and heated to seal said end of the tube.

In making the sleeve assembly 10 one end of a cylindrical thermoplastic sleeve 12 is slid over the shank portion 22 of a flaring tool 23 and is supported thereby with the end of the tube engageable with a shoulder 24 formed on the head 25 of the tool. The shank has a reduced portion 26 for telescopingly receiving one end of the metal tube 14, one end of which is engageable with a shoulder 27 formed on the shank 22. One end of the cylindrical metal sleeve 14 is adapted to be telescoped over a shank 30 of a cooperating flaring tool 31. The shank 30 has an outwardly curved portion 36 forming an annular forming surface for flaring one end of the metal tube 14 and an enlarged portion 33 of the shank is adapted to receive one end of the plastic tube 12. The tool 31 has a rectangular head 34 which fits into a guideway 36 of a guide member 37 along with the head 25 of the tool 23 for positioning the shanks of the tools and the sleeves 12 and 14 in coaxial alignment with each other, whereby the tools may be moved towards each other to slide the metal sleeve 14 within the plastic sleeve 12 and to position them with the end of the sleeve 14 abutting the shoulder 27 of the tool 23. The tools 23 and 31 with the sleeves 12 and 14 supported thereon in telescoping relation are then moved between a pair of relatively movable pressure transmitting heads 40 and 41 of a press or other device which is actuated to move the flaring tools 31 and 23 towards each other to a predetermined position with the ends of the shanks 26 and 30 of the tools in abutting engagement with each other to cause the flaring surface 32 to flare the end 16 of the tube 14 outwardly into engagement with the plastic sleeve 12 to form an interlocking connection therewith. The tools 23 and 31 with the interlocked sleeves 12 and 14 thereon are withdrawn from the heads 40 and 41 and the tool 31 with the assembly of sleeves 12 and 14 thereon is removed from the tool 23 and placed in a slideway 44 of a guide 45 with the sleeves 12 and 14 in coaxial alignment with the axis of a sealing device 46.

Figure 1:
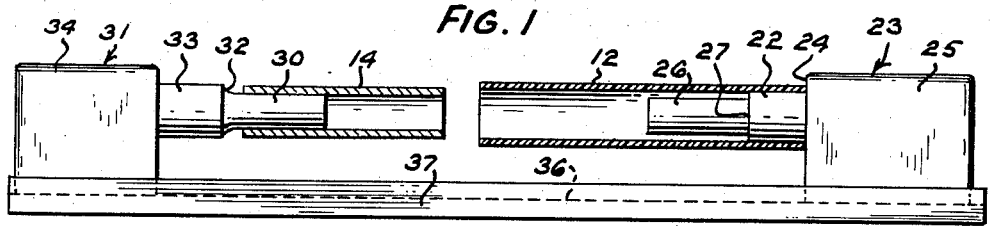
Figure 2:
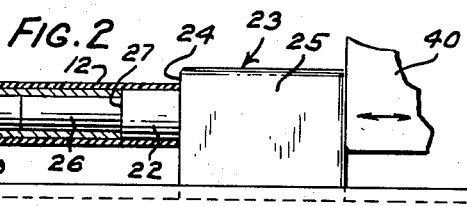
Fig. 2 is a view of the metal and thermoplastic sleeves mounted on the flaring tools and in assembled relation.
Figure 3:
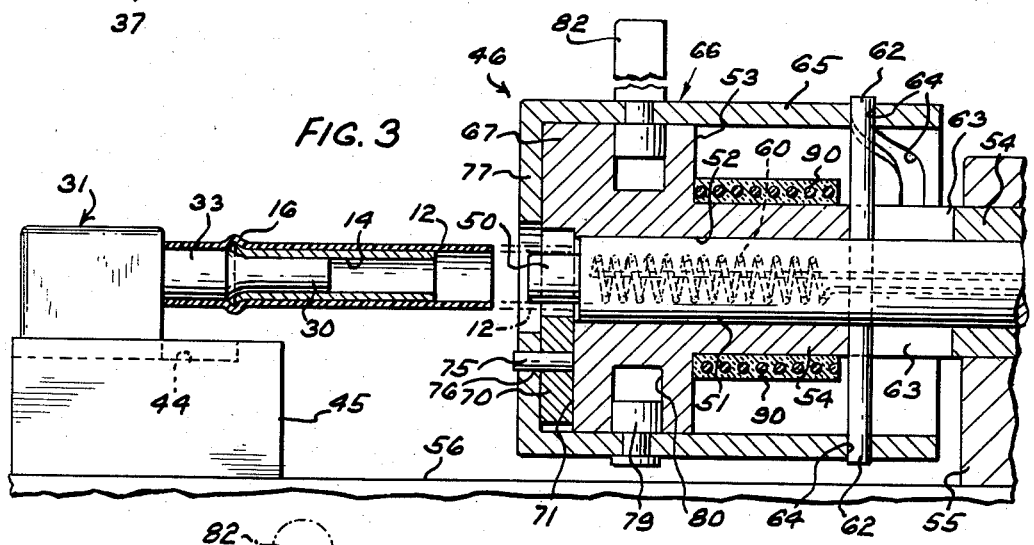
Fig. 3 is a vertical sectional view of a sealing device and the assembled sleeves supported on one of the flaring tools in position to be moved into engagement therewith.

In response to the movement of the tool 31 to a predetermined position against a stop on the guide 45 the forward end of the plastic tube 12 is moved into an aperture in the sealing device 46 and is telescopingly positioned about the end of a cylindrical heater member 50 as indicated in dotted lines in Fig. 3 for internally heating the end portion of the plastic tube 12 prior to the walls thereof being collapsed and pressed into sealing engagement with each other. The cylindrical heating member 50 has an enlarged body portion 51 and is mounted for axial reciprocation in a bore 52 of a supporting member 53. The member 53 has a cylindrical shank 54 which is stationarily supported by a bracket 55 mounted on a base plate 56 on which the guide 45 is also mounted. An electrical heating element 60 mounted in a bore in the heating member 50 is connected to a source of electrical power for heating the member 50.

The heating member 50 is withdrawn from the end of the tube 12 prior to the sealing of the tube and for this purpose the heating member 50 is provided with a pair of radially directed pins 62 extending through axial slots 63 in the shank of the body member 53 and with the ends thereof disposed in cam slots 64 of a cylindrical skirt 65 of an actuating member 66 oscillatably supported on the head 67 of the supporting member 53. The cam slots 64 are so designed that in response to a predetermined oscillating movement of the actuating member 66 the heating member 50 will be reciprocated to and from its normal position shown in Fig. 3 and a retracted position in spaced relation to the end of the tube 12 positioned within the sealing device 46.

Figure 4:
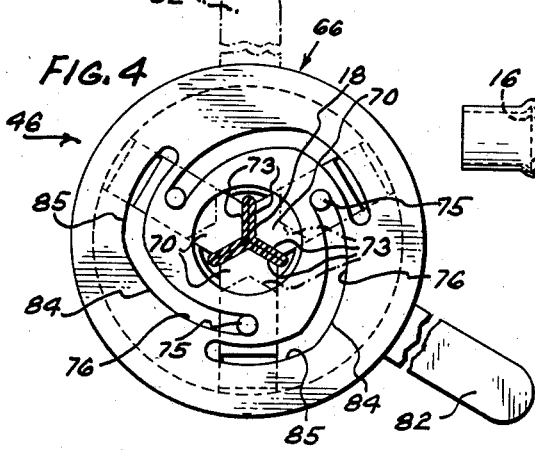
Fig. 4 is an end view of the sleeve sealing device.

Three sealing jaws 70 are mounted for radial movement toward and away from each other in radially disposed guideways 71 formed in the head 67. The sealing jaws 70 each have a pair of diverging forming surfaces 73 which are adapted to engage the outer surfaces of portions of the end of the sleeve and collapse the walls of the sleeve inwardly and press them together against each other into a Y shape in response to movement of the sealing jaws radially from a normal outer position shown in Fig. 3 to an operative position indicated in Fig. 4. The sealing jaws 70 have pins 75 which project into cam slots 76 formed in a transversely disposed centrally apertured end wall 77 of the actuating member 66. The actuating member 66 is held against axial displacement by a plurality of pins 79 riding in an annular groove 80 in the head 67 and the actuating member 66 has a handle member 82 of heat insulating material secured thereto by means of which it may be oscillated. The cam slots 76 and the actuating member 66 have spiral portions 84 for moving the sealing jaws to and from their operative positions and have dwell portions 85 concentric with the axis of the head for maintaining the sealing jaws in inoperative position during the actuation of the heating member 50 to and from its normal and retracted positions.

An annular electrical heating element 90 is mounted on the shank 54 of the supporting member 53 in engagement with the head 67 to heat the head and the sealing jaws 70 to a predetermined temperature. Thus, when the jaws are moved inwardly to compress the walls of the plastic sleeve 12 into engagement with each other the heated jaws serve to aid in heating the end portion of the sleeve to a state of plasticity necessary to achieve a good seal between the wall portions of the tube. The heating elements 60 and 90, if desired, may be sufficiently large so that either one may heat the end of the thermoplastic sleeve to the required temperature.

In order to seal the end of the thermoplastic sleeve 12, the tool 31 is moved forward in the guideway 44 to its forward position to dispose the end portion of the plastic tube 12 over the heating member 50 and be internally heated thereby, and after a predetermined period of time sufficient to heat the sleeve to a predetermined temperature, the handle 82 may be oscillated to rotate the actuating member 66, during the first portion of which the heating member 50 is retracted from its operative position within the end of the sleeve, after which the heated sealing jaws are moved from their outer position inwardly to collapse the walls of the end portion of the sleeve 12 and press them into engagement with each other while applying heat thereto to seal the end of the tube.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of making electrical connectors for splicing conductors which comprises providing a metal sleeve having a predetermined length and a uniform inside diameter for receiving the conductors therein, providing a dielectric thermoplastic sleeve having a predetermined length greater than that of the metal sleeve and having an inner diameter substantially equal to the outer diameter of the metal sleeve for slidably receiving the metal sleeve therein, placing the metal sleeve in a predetermined position within the dielectric sleeve and with the ends thereof spaced inwardly from the ends of the dielectric sleeve, flaring one end of the metal sleeve to interlock the sleeves against movement relative to each other and to form a curved sloping inner surface on one end of the metal sleeve which merges with the inner surface of the dielectric sleeve for guiding the conductors into the metal sleeve, heating the end of the dielectric sleeve adjacent the unflared end of the metal sleeve, and pressing together the heated walls of said end of the dielectric sleeve to seal said end.

2. The method of making electrical connectors for splicing conductors which comprises providing a metal sleeve having a predetermined length and a uniform inside diameter for receiving the conductors therein, providing a dielectric thermoplastic sleeve having a predetermined length greater than that of the metal sleeve and having an inner diameter substantially equal to the outer diameter of the metal sleeve for slidably receiving the metal sleeve therein, placing the metal sleeve in a predetermined position within the dielectric sleeve and with the ends thereof spaced inwardly from the ends of the dielectric sleeve, flaring one end of the metal sleeve to interlock the sleeves against movement relative to each other and to form a curved sloping inner surface on one end of the metal sleeve which engages the inner surface of the dielectric sleeve for guiding the conductors into the metal sleeve, applying heat internally and externally with heated surfaces to the end of the dielectric sleeve adjacent the unflared end of the metal sleeve, and applying radially inwardly directed pressure at three circumferentially spaced portions of the heated end of the dielectric sleeve to seal said end.

References Cited in the file of this patent

UNITED STATES PATENTS

| | | |
|---|---|---|
| 1,168,067 | Haefely | Jan. 11, 1916 |
| 1,848,867 | Callaway | Mar. 8, 1932 |
| 1,914,634 | Eden | June 20, 1933 |
| 2,216,833 | Barry | Oct. 8, 1940 |
| 2,266,796 | Parker | Dec. 23, 1941 |
| 2,337,742 | Dittmar | Dec. 28, 1943 |
| 2,406,059 | Burch | Aug. 20, 1946 |
| 2,429,585 | Rogoff | Oct. 21, 1947 |
| 2,479,702 | Rood | Aug. 23, 1949 |
| 2,565,316 | Lucas | Aug. 21, 1951 |
| 2,659,128 | Baldwin, Jr. | Nov. 17, 1953 |